(12) United States Patent
Lu et al.

(10) Patent No.: US 7,293,204 B2
(45) Date of Patent: Nov. 6, 2007

(54) COMPUTER PERIPHERAL CONNECTING INTERFACE SYSTEM CONFIGURATION DEBUGGING METHOD AND SYSTEM

(75) Inventors: Ying-chi Lu, Taipei (TW); Meng-Hua Cheng, Taipei (TW); Chun-Yi Lee, Taipei (TW); Lung-Hung Yu, Taipei (TW); Chi-Tsung Chang, Taipei (TW); Chia-Hsing Lee, Taipei (TW)

(73) Assignee: Inventec Corporation (TW)

( * ) Notice: Subject to any disclaimer, the term of this patent is extended or adjusted under 35 U.S.C. 154(b) by 337 days.

(21) Appl. No.: 11/051,230

(22) Filed: Feb. 4, 2005

(65) Prior Publication Data

US 2006/0136794 A1    Jun. 22, 2006

(51) Int. Cl.
| | |
|---|---|
| *G06F 11/00* | (2006.01) |
| *G06F 9/00* | (2006.01) |
| *G06F 9/24* | (2006.01) |
| *G06F 15/177* | (2006.01) |
| *G06F 1/24* | (2006.01) |
| *G06F 3/00* | (2006.01) |
| *G06F 13/00* | (2006.01) |
| *G05B 11/01* | (2006.01) |

(52) U.S. Cl. ........................ 714/44; 714/30; 714/31; 714/40; 714/43; 713/1; 713/100; 710/10; 710/19; 710/104; 700/26

(58) Field of Classification Search ................ 714/100, 714/1, 25–27, 30, 31, 37–40, 44; 710/8, 710/10, 15, 19, 104; 713/1, 100; 700/26; 702/123

See application file for complete search history.

(56) References Cited

U.S. PATENT DOCUMENTS

| | | | | |
|---|---|---|---|---|
| 5,960,213 | A | * | 9/1999 | Wilson ........................ 710/2 |
| 6,049,894 | A | * | 4/2000 | Gates .......................... 714/41 |
| 6,247,079 | B1 | * | 6/2001 | Papa et al. ................... 710/302 |
| 6,253,334 | B1 | * | 6/2001 | Amdahl et al. ................ 714/4 |
| 6,442,448 | B1 | * | 8/2002 | Finley et al. ................ 700/231 |
| 6,546,482 | B1 | * | 4/2003 | Magro et al. ................... 713/1 |
| 6,760,868 | B2 | * | 7/2004 | Drogichen et al. ........... 714/41 |
| 6,954,712 | B2 | * | 10/2005 | Bingham et al. ........... 702/123 |
| 7,020,815 | B2 | * | 3/2006 | Jeddeloh ..................... 714/718 |

\* cited by examiner

*Primary Examiner*—Crystal J. Barnes
(74) *Attorney, Agent, or Firm*—Peter F. Corless; Steven M. Jensen; Edwards Angell Palmer & Dodge LLP

(57) ABSTRACT

A computer peripheral connecting interface system configuration debugging method and system is proposed, which is designed for use in conjunction with a computer platform that is equipped with a particular type of peripheral connecting interface, such as a PCI (Peripheral Component Interconnect) interface, for automatically finding errors in the PCI system configurations of a group of peripheral devices connected to the PCI peripheral connecting interface, and if errors are found, capable of automatically generating an electronic error report. This fully-automatic debugging capability can help software engineers to more conveniently and efficiently correct the errors in the PCI system configurations on a computer platform.

6 Claims, 3 Drawing Sheets

31

| 31 | 16 | 15 | 0 | |
|---|---|---|---|---|
| Device ID | | Vendor ID | | 00h |
| Status | | Command | | 04h |
| Class Code | | | Revision ID | 08h |
| BIST | Header Type | Latency Timer | Cache Line Size | 0Ch |
| Base Address Registers | | | | 10h |
| | | | | 14h |
| | | | | 18h |
| | | | | 1Ch |
| | | | | 20h |
| | | | | 24h |
| Cardbus CIS Pointer | | | | 28h |
| Subsystem ID | | Subsystem Vendor ID | | 2Ch |
| Expansion ROM Base Address | | | | 30h |
| Reserved | | | Capabilities Pointer | 34h |
| Reserved | | | | 38h |
| Max_Lat | Min_Gnt | Interrupt Pin | Interrupt Line | 3Ch |

| 31 24 | 23 16 | 15 8 | 7 0 | |
|---|---|---|---|---|
| \multicolumn{2}{c|}{Device ID} | \multicolumn{2}{c|}{Vendor ID} | 00 h |

| 31 24 23 16 | 15 8 7 0 | |
|---|---|---|
| Device ID | Vendor ID | 00 h |
| Status | Command | 04h |
| Class Code | Revision ID | 08h |
| BIST \| Header Type \| Primary Latency Timer | Cacheline Size | 0Ch |
| Base Address Register 0 | | 10h |
| Base Address Register 1 | | 14h |
| Secondary Latency Timer \| Subordinate Bus Number \| Secondary Bus Number | Primary Bus Number | 18h |
| Secondary Status \| I/O Limit | I/O Base | 1Ch |
| Memory Limit | Memory Base | 20h |
| Prefetchable Memory Limit | Prefetchable Memory Base | 24h |
| Prefetchable Base Upper 32 Bits | | 28h |
| Prefetchable Limit Upper 32 Bits | | 2Ch |
| I/O Limit Upper 16 Bits | I/O Base Upper 16 Bits | 30h |
| Reserved | Capabilities Pointer | 34h |
| Expansion ROM Base Address | | 38h |
| Bridge Control | Interrupt Pin \| Interrupt Line | 3Ch |

FIG. 2B

COMPUTER PERIPHERAL CONNECTING INTERFACE SYSTEM CONFIGURATION DEBUGGING METHOD AND SYSTEM

BACKGROUND OF THE INVENTION

1. Field of the Invention

This invention relates to information technology (IT), and more particularly, to a computer peripheral connecting interface system configuration debugging method and system which is designed for use in conjunction with a computer platform that is equipped with a particular type of peripheral connecting interface, such as a PCI (Peripheral Component Interconnect) interface, for automatically finding errors in the system configurations of one or more peripheral devices connected to the PCI peripheral connecting interface, and if errors are found, capable of automatically generating an electronic error report for software engineers to more conveniently and efficiently correct the errors in the PCI system configurations.

2. Description of Related Art

PCI (Peripheral Component Interconnect) is a standard peripheral bus architecture that is widely utilized on a computer platform, such as desktop computer, notebook computer, network server, and the like, for connecting the central processing unit of the computer platform externally to various kinds of peripheral devices, such as monitor adapters, RAID (Redundant Array of Independent Disks) adapters, network adapters, to name a few, for the purpose of allowing the central processing unit to exchange data with these peripheral devices.

Since a computer platform is typically installed with multiple peripheral devices, it is an important task in BIOS programming to ensure that each peripheral device's system configuration is set correctly and unconflicted with the system configurations of other peripheral devices. If errors are found in the PCI system configurations, software engineers need to modify related BIOS code to correct the errors in the PCI system configurations.

Presently, a conventional PCI system configuration debugging method is performed manually by test engineers, which includes a first step of visually inspecting the contents of Expansion ROM (Read Only Memory) by the test engineer to check whether each PCI peripheral device's system configuration has been correctly set. If NO, the test engineer then needs to visually inspect the contents of the configuration register and related BIOS code of the faulted PCI peripheral device to find the erroneous settings. When errors are found, the test engineer then manually write an error report and submit the error report to the software development division for software engineers to correct the errors in the PCI system configurations by modifying related BIOS code. Beside this, another drawback in the conventional PCI system configuration debugging method is that when the test engineer inspects the [I/O Memory Base] parameter in the Configuration Register of a PCI-PCI bridge, it requires the test engineer to tediously inspect whether the [I/O Memory Range] parameters are correctly set.

For the above-mentioned reasons, the conventional PCI system configuration debugging method is therefore very tedious, laborious, and time-consuming and thus highly inefficient. Moreover, the visual inspection by test engineers to find errors would easily lead to inaccurate and mistaken results.

SUMMARY OF THE INVENTION

It is therefore an objective of this invention to provide a computer peripheral connecting interface system configuration debugging method and system which is capable of performing a fully-automated PCI system configuration debugging procedure and, if errors are found, capable of automatically generating an electronic error report that can help software engineers to more conveniently and efficiently correct all the errors in the PCI system configurations.

The computer peripheral connecting interface system configuration debugging method and system according to the invention is designed for use in conjunction with a computer platform that is equipped with a particular type of peripheral connecting interface, such as a PCI (Peripheral Component Interconnect) interface, for automatically finding errors in the system configurations of one or more peripheral devices connected to the PCI peripheral connecting interface, and if errors are found, capable of automatically generating an electronic error report for software engineers to more conveniently and efficiently correct the errors in the PCI system configurations.

The computer peripheral connecting interface system configuration debugging method and system according to the invention is characterized by the capability of performing a fully-automatic PCI system configuration debugging procedure and the capability of automatically generating an electronic error report. This fully-automatic debugging capability can help software engineers to more conveniently and efficiently correct the errors in the PCI system configurations on a computer platform. The invention is therefore more advantageous to use than prior art.

BRIEF DESCRIPTION OF DRAWINGS

The invention can be more fully understood by reading the following detailed description of the preferred embodiments, with reference made to the accompanying drawings, wherein:

FIG. 2A is a schematic diagram showing an example of the data structure of a PCI system configuration register in a PCI peripheral connecting interface where the computer peripheral connecting interface system configuration debugging system of the invention is utilized; and FIG. 2B is a schematic diagram showing an example of the data structure of a system configuration register in a PCI-PCI bridge that is coupled to a PCI peripheral connecting interface where the computer peripheral connecting interface system configuration debugging system of the invention is utilized.

DETAILED DESCRIPTION OF PREFERRED EMBODIMENTS

Figure 1:
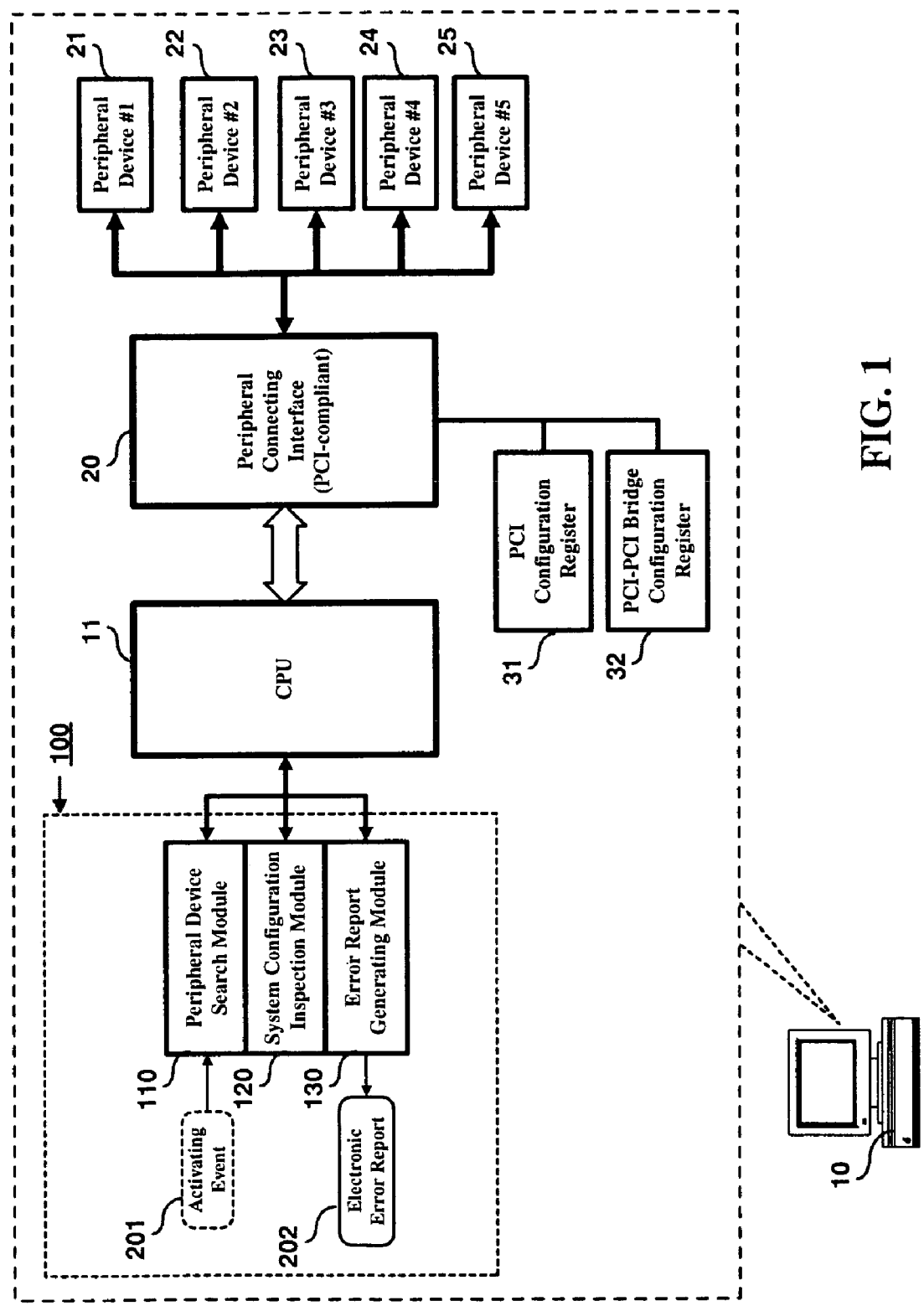
FIG. 1 is a schematic diagram showing the application architecture and modularized object-oriented component model of the computer peripheral connecting interface system configuration debugging system according to the invention.

The computer peripheral connecting interface system configuration debugging method and system according to the invention is disclosed in full details by way of preferred embodiments in the following with reference to the accompanying drawings.

FIG. 1 is a schematic diagram showing the application architecture and modularized object-oriented component model of the computer peripheral connecting interface system configuration debugging system according to the invention (as the part enclosed in the dotted box indicated by the reference numeral 100). As shown, the computer peripheral connecting interface system configuration debugging system of the invention 100 is designed for use in conjunction with a computer platform 10 (such as a desktop computer) that is equipped with a particular type of peripheral connecting interface 20, such as a PCI (Peripheral Component Interconnect) interface, for automatically finding errors in the system configurations of one or more peripheral devices (such as 5 peripheral devices 21, 22, 23, 24, 25 in the example of FIG. 1, but in practice, the number of peripheral devices is unrestricted) that are connected to the PCI peripheral connecting interface 20. If errors in the PCI system configuration of any one of the peripheral devices 21, 22, 23, 24, 25 are found, the computer peripheral connecting interface system configuration debugging system of the invention 100 is capable of automatically generating an electronic error report 202 for the user (i.e., software engineers) to more conveniently and efficiently correct the errors in the PCI system configurations.

In practical implementation, the computer peripheral connecting interface system configuration debugging system of the invention 100 can be fully realized by computer program and integrated as an add-on software/firmware module to the BIOS (Basic Input/Output System) of the computer platform 10 for execution by the CPU (Central Processing Unit) 11 of the computer platform 10 to provide the desired PCI system configuration debugging functionality.

As shown in FIG. 1, the modularized object-oriented component model of the computer peripheral connecting interface system configuration debugging system of the invention 100 comprises: (a) a peripheral device search module 110; (b) a system configuration inspection module 120; and (c) an error report generating module 130.

The peripheral device search module 110 is capable of searching through the PCI peripheral connecting interface 20 to find whether the PCI peripheral connecting interface 20 is connected with peripheral devices (in the example of FIG. 1, 5 peripheral devices 21, 22, 23, 24, 25 are connected). As the peripheral device search module 110 finds each one of the peripheral devices 21, 22, 23, 24, 25, it will issue a system configuration inspection enabling message to the system configuration inspection module 120. In practical implementation, for example, this peripheral device search module 110 can utilize BIOS's standard Bus/Dev/Func parameters to search through the PCI peripheral connecting interface 20 for any connected peripheral device. In this case, the first step is to set [Bus="Primary Bus", Dev=0, Func=0], and then let Dev+1 and Fun+1 to sequentially check whether each connecting slot of the PCI peripheral connecting interface 20 is connected with a peripheral device. If the search procedure finds a PCI-PCI bridge, it will automatically set [Bus="Secondary Bus", Dev=0, Func=0] to start the search through the PCI-PCI bridge for any connected peripheral device. As the peripheral device search module 110 finds a peripheral device connected to the PCI-PCI bridge, it will likewise issue a system configuration inspection enabling message to the system configuration inspection module 120.

The system configuration inspection module 120 is capable of responding to each system configuration comparison enabling message from the above-mentioned peripheral device search module 110 by automatically inspecting whether the system configuration of each found peripheral device (21, 22, 23, 24, or 25) is correct and unconflicted with the system configurations of other peripheral devices. If YES, the system configuration inspection module 120 issues a system configuration correct message; whereas if NO, the system configuration inspection module 120 issues a system configuration incorrect message. In practical implementation, for example, the system configuration inspection module 120 can be realized by the following algorithm:

(S1) Preserve the contents of [BAR] (Base Address Register);
(S2) Fill "FFFF FFFFh" into [BAR];
(S3) Read out the contents of [BAR], and calculate the required amount of memory space;
(S4) Restore [BAR]; and
(S5) Determine whether the required memory amount is between [Base] and [Limit]; if YES, issue a system configuration incorrect message;

wherein
[BAR] is a data item in the PCI Configuration Register 31 shown in FIG. 2A; while [Base] and [Limit] are data items in the PCI-PCI Bridge Configuration Register 32 shown in FIG. 2B.

The error report generating module 130 is capable of responding to the system configuration incorrect message from the above-mentioned system configuration inspection module 120 by generating an electronic error report 202 which lists all the errors in the PCI system configurations of all the peripheral device 21, 22, 23, 24, 25 connected to the PCI peripheral connecting interface 20. In practical implementation, for example, the error report generating module utilize the standard REP (Report) file format to generate the electronic error report 202 so as to allow the contents of the electronic error report 202 to be easy to read by the user.

Referring to FIG. 1, in actual operation, when a test engineer wants to debug the system configurations of the PCI peripheral connecting interface 20 on the computer platform 10, he/she should first initiate an activating event 201, for example by pressing a special key or key combination on keyboard or using mouse to select a special button or option on screen, which will activate the peripheral device search module 110 to respond to this activating event 201 by searching through the PCI peripheral connecting interface 20 to find whether the PCI peripheral connecting interface 20 is connected with peripheral devices. In the example of FIG. 1, 5 peripheral devices 21, 22, 23, 24, 25 are connected, and therefore, as the peripheral device search module 110 finds the first peripheral device 21, it will issue a system configuration inspection enabling message to the system configuration inspection module 120, thereby activating the system configuration inspection module 120 to respond by inspecting whether the PCI system configuration of the first found peripheral device 21 is correct and unconflicted with the PCI system configurations of other peripheral devices 22, 23, 24, 25. If YES, the system configuration inspection module 120 issues a system configuration correct message; whereas if NO, the system configuration inspection module 120 issues a system configuration incorrect message. In response to the system configuration incorrect message, the error report generating module 130 is activated to generate an electronic error report 202 in the standard REP (Report) file format, which lists all the errors in the system configuration of the first found peripheral device 21. The use of the REP file format allows the contents of the electronic error report 202 to be easy to read by the user. The same process is repeated until all of the other peripheral devices 22, 23, 24, 25 have been checked.

After the system configuration debugging procedure is completed and errors are found, the test engineer can submit the electronic error report 202 to the software development division for software engineers to correct the errors in the system configurations of the PCI peripheral connecting interface 20 by modifying related BIOS code.

In conclusion, the invention provides a computer peripheral connecting interface system configuration debugging method and system for use in conjunction with a computer platform that is equipped with a particular type of peripheral connecting interface, such as a PCI (Peripheral Component Interconnect) interface, for automatically finding errors in the PCI system configurations of a group of peripheral devices connected to the PCI peripheral connecting interface, and if errors are found, capable of automatically generating an electronic error report. This fully-automatic debugging capability can help software engineers to more conveniently and efficiently correct the errors in the PCI system configurations on a computer platform. The invention is therefore more advantageous to use than the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A computer peripheral connecting interface system configuration debugging method for use on a computer platform that is equipped with a particular type of peripheral connecting interface and a basic input/output system (BIOS) program, the BIOS program having parameters of corresponding peripheral devices and being equipped with a system configuration register corresponding to the peripheral connecting interface and a peripheral device-peripheral device bridge configuration register, the system configuration register corresponding to the peripheral connecting interface having a base address register (BAR) data item, the peripheral device-peripheral device bridge configuration register having Base and Limit data items, the method for performing an automatic debugging procedure on the system configurations of the peripheral connecting interface, the computer peripheral connecting interface system configuration debugging method comprising:

sequentially searching through each connecting slot of the peripheral connecting interface according to the peripheral devices corresponding to the parameters to find whether the connecting slot is inserted with the corresponding peripheral devices, and issuing a system configuration inspection enabling message upon finding one peripheral device;

responding to each system configuration comparison enabling message by automatically inspecting whether the system configuration of each found peripheral device is correct and unconflicted with the system configurations of other peripheral devices; if NO, issuing a system configuration incorrect message, wherein the inspecting step comprises:

(a) preserving contents of the BAR data item;
(b) filling a predetermined value into the BAR data item;
(c) reading out the contents of the BAR data item, and calculating a required amount of memory space;
(d) restoring the BAR data item; and
(e) determining whether the required memory amount is between the Base data item and the Limit data item; if YES, issuing a system configuration incorrect message; and responding to the system configuration incorrect message from the system configuration inspection module by generating an electronic error report which lists all the errors in the system configuration of the peripheral connecting interface.

2. The computer peripheral connecting interface system configuration debugging method of claim 1, wherein the peripheral connecting interface is a PCI (Peripheral Component Interconnect) compliant peripheral connecting interface.

3. The computer peripheral connecting interface system configuration debugging method of claim 1, wherein the electronic error report is formatted in standard REP (Report) file format.

4. A computer peripheral connecting interface system configuration debugging system for use with a computer platform that is equipped with a particular type of peripheral connecting interface and a basic input/output system (BIOS) program, the BIOS program having parameters of corresponding peripheral devices and being equipped with a system configuration register corresponding to the peripheral connecting interface and a peripheral device-peripheral device bridge configuration register, the system configuration register corresponding to the peripheral connecting interface having a base address register (BAR) data item, the peripheral device-peripheral device bridge configuration register having Base and Limit data items, the method for performing an automatic debugging procedure on the system configurations of the peripheral devices connected to the peripheral connecting interface, the computer peripheral connecting interface system configuration debugging system comprising:

a peripheral device search module, which is capable of sequentially searching through each connecting slot of the peripheral connecting interface according to the peripheral devices corresponding to the parameters to find whether the connecting slot is inserted with the corresponding peripheral devices; if one peripheral device is found, capable of issuing a system configuration inspection enabling message;

a system configuration inspection module, which is capable of responding to each system configuration comparison enabling message from the peripheral device search module by automatically inspecting whether the system configuration of each found peripheral device is correct and unconflicted with the system configurations of other peripheral devices; if NO, capable of issuing a system configuration incorrect message, wherein the inspecting step comprises:

(a) preserving contents of the BAR data item;
(b) filling a predetermined value into the BAR data item;
(c) reading out the contents of the BAR data item, and calculating a required amount of memory space;
(d) restoring the BAR data item; and
(e) determining whether the required memory amount is between the Base data item and the Limit data item: if YES, issuing a system configuration incorrect message; and an error report generating module, which is capable of responding to the system configuration incorrect message from the system configuration inspection module by generating an electronic error report which lists all the errors in the system configuration of the peripheral connecting interface.

5. The computer peripheral connecting interface system configuration debugging system of claim 4, wherein the peripheral connecting interface is a PCI (Peripheral Component Interconnect) compliant PCI peripheral connecting interface.

6. The computer peripheral connecting interface system configuration debugging system of claim 4, wherein the electronic error report genrated by the error report generating module is formatted in standard REP (Report) file format.

* * * * *